(12) United States Patent
Schmid et al.

(10) Patent No.: US 9,774,368 B2
(45) Date of Patent: *Sep. 26, 2017

(54) TDD REPEATER FOR A WIRELESS NETWORK AND METHOD FOR OPERATING SAID REPEATER

(71) Applicant: Andrew Wireless Systems GmbH, Buchdorf (DE)

(72) Inventors: Peter Schmid, Marxheim-Neuhasen (DE); Oliver Braz, Monheim (DE); Peter Gunzer, Monheim (DE); Mathias A. Schmalisch, Lynchburg, VA (US); Joerg Stefanik, Donauworth (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,286

(22) Filed: Dec. 16, 2015

(65) Prior Publication Data

US 2016/0099748 A1  Apr. 7, 2016

Related U.S. Application Data

(63) Continuation of application No. 14/279,100, filed on May 15, 2014, now Pat. No. 9,219,524, which is a
(Continued)

(30) Foreign Application Priority Data

Apr. 9, 2008 (DE) .................. 10 2008 017 881

(51) Int. Cl.
*H04B 3/36* (2006.01)
*H04B 7/155* (2006.01)
(Continued)

(52) U.S. Cl.
CPC ............ *H04B 3/36* (2013.01); *H04B 7/0413* (2013.01); *H04B 7/155* (2013.01); *H04L 5/14* (2013.01);
(Continued)

(58) Field of Classification Search
None
See application file for complete search history.

(56) References Cited

U.S. PATENT DOCUMENTS 4,794,649 A   12/1988  Fujiwara
5,371,548 A   12/1994  Williams
(Continued)

FOREIGN PATENT DOCUMENTS

CN  1756121 A   4/2006
DE  19738254     3/1999
(Continued)

OTHER PUBLICATIONS

European Patent Office, "European Search Report for EP Application No. 13005254.1", dated Dec. 10, 2013, pp. 1-7, Published in: EP.

(Continued)

*Primary Examiner* — Christine Duong
(74) *Attorney, Agent, or Firm* — Fogg & Powers LLC

(57) ABSTRACT

A repeater (1) particularly suitable for a time-division duplex transmission of communication signals is provided. The repeater (1) comprises a master unit (2) for communicating with a base station (3) of a wireless network, at least one remote unit (4) for communicating with a network terminal, as well as a waveguide (11) connecting the remote unit (4) with the master unit (2) for transmitting the communication signals in an uplink direction (6) from the remote unit (4) to the master unit (2) and in a downlink direction (5) from the master unit (2) to the remote unit (4).

(Continued)

Both the master unit (2) and the remote unit (4) comprise one switch (19, 20) each for changing over the signal transmission between uplink direction (6) and downlink direction (5). Both switches (19, 20) are selected by a synchronizing unit (21) arranged in the master unit (2), the synchronizing unit (21) being designed for determining a clock pulsing from the communication signal fed to the master unit (2)—in particular from the base station (3)—and for supplying a control signal corresponding to this clock pulsing to the switches (19, 20).

19 Claims, 1 Drawing Sheet

Related U.S. Application Data continuation of application No. 12/936,760, filed as application No. PCT/EP2009/001655 on Mar. 7, 2009, now Pat. No. 8,730,848.

(51) Int. Cl.
  H04L 5/14         (2006.01)
  H04L 7/00         (2006.01)
  H04B 7/0413       (2017.01)

(52) U.S. Cl.
  CPC .......... *H04L 5/1415* (2013.01); *H04L 7/0012* (2013.01); *H04L 7/0033* (2013.01)

(56) References Cited

U.S. PATENT DOCUMENTS

| | | |
|---|---|---|
| 5,471,187 A | 11/1995 | Hansen et al. |
| 5,602,836 A | 2/1997 | Papadopoulos et al. |
| 6,108,364 A | 8/2000 | Weaver, Jr. et al. |
| 6,115,369 A | 9/2000 | Oura |
| 6,512,427 B2 | 1/2003 | Nakano |
| 6,577,617 B1 | 6/2003 | Ue et al. |
| 6,650,630 B1 | 11/2003 | Haartsen |
| 6,856,736 B2 | 2/2005 | Deutsch et al. |
| 6,940,827 B2 | 9/2005 | Li et al. |
| 6,985,538 B2 | 1/2006 | Murakami et al. |
| 7,233,771 B2 | 6/2007 | Proctor, Jr. et al. |
| 7,486,639 B2 | 2/2009 | Stanwood et al. |
| 7,519,323 B2 | 4/2009 | Mohebbi |
| 7,627,067 B2 | 12/2009 | Coulson |
| 7,653,163 B2 | 1/2010 | Sadri et al. |
| 7,715,871 B2 | 5/2010 | Duan |
| 7,773,887 B2 | 8/2010 | Lee et al. |
| 7,848,647 B2 | 12/2010 | Watanabe |
| 7,876,716 B2 | 1/2011 | Sudo |
| 7,894,332 B2 | 2/2011 | Chen |
| 7,899,084 B2 | 3/2011 | Cho et al. |
| 7,979,022 B2 | 7/2011 | Cho et al. |
| 8,041,222 B2 | 10/2011 | Lee et al. |
| 8,165,100 B2 | 4/2012 | Sabat et al. |
| 8,300,724 B2 | 10/2012 | Rheinfelder et al. |
| 8,374,110 B2 | 2/2013 | Kwon et al. |
| 8,730,848 B2 | 5/2014 | Schmid et al. |
| 9,130,641 B2 | 9/2015 | Mohebbi |
| 2006/0013594 A1 | 1/2006 | Sung et al. |
| 2007/0015462 A1 | 1/2007 | Dean et al. |
| 2007/0230432 A1 | 10/2007 | Choi et al. |
| 2007/0268846 A1 | 11/2007 | Proctor et al. |
| 2008/0056167 A1 | 3/2008 | Kim et al. |
| 2010/0002620 A1 | 1/2010 | Proctor, Jr. et al. |
| 2010/0097964 A1 | 4/2010 | Astely et al. |
| 2014/0254440 A1 | 9/2014 | Schmid et al. |

FOREIGN PATENT DOCUMENTS

| | | |
|---|---|---|
| EP | 0986192 A2 | 3/2000 |
| EP | 1995968 A2 | 11/2008 |
| GB | 2418803 A | 4/2006 |
| JP | 07131401 A | 5/1995 |
| KR | 20040108468 A | 12/2004 |
| KR | 100473992 B1 | 3/2005 |
| KR | 20060032934 A | 4/2006 |
| KR | 10063868 | 1/2007 |
| WO | 2006107136 A1 | 10/2006 |
| WO | 2007102707 | 9/2007 |
| WO | 2009124624 A1 | 10/2009 |

OTHER PUBLICATIONS

Durach, "Leaky Feeder Cables for In-House Coverage", "Funkschau", 1997, pp. 48-49.

China Patent Office, "Notice of Granting Patent Right for CN Application No. 200980120599.X", "National Stage filing of PCT Application No. PCT/EP2009/001655", dated Aug. 7, 2015, pp. 1-2, Published in: CN.

China Patent Office, "First Office Action for CN Application No. 200980120599.X", dated Feb. 6, 2013, pp. 1-21, Published in: CN.

China Patent Office, "Second Office Action from CN Application No. 200980120599.X", "National Stage filing of PCT Application No. PCT/EP2009/001655", dated Nov. 12, 2013, pp. 1-4, Published in: U.S.

China Patent Office, "Third Office Action from CN Application No. 200980120599.X", "National Stage filing of PCT Application No. PCT/EP2009/001655", dated Jun. 3, 2014, pp. 1-13, Published in: CN.

China Patent Office, "Fourth Office Action for CN Application No. 200980120599.X", "National Stage filing of PCT Application No. PCT/EP2009/001655", dated Feb. 17, 2015, pp. 1-10, Published in: CN.

U.S. Patent Office, "Final Office Action", "from U.S. Appl. No. 12/936,760", dated Aug. 30, 2013, pp. 1-15, Published in: U.S.

U.S. Patent Office, "Notice of Allowance", "from U.S. Appl. No. 12/936,760", dated Dec. 31, 2013, pp. 1-15, Published in: U.S.

U.S. Patent Office, "Office Action", "from U.S. Appl. No. 12/936,760", dated Mar. 4, 2013, pp. 1-25, Published in: U.S.

U.S. Patent Office, "Notice of Allowance", "from U.S. Appl. No. 14/279,100", dated Aug. 6, 2015, pp. 1-5, Published in: U.S.

U.S. Patent Office, "Office Action", "from U.S. Appl. No. 14/279,100", dated Mar. 10, 2015, pp. 1-30, Published in: U.S.

International Search Authority, "International Search Report and Written Opinion from PCT Application No. PCT/EP2009/001655", dated Aug. 20, 2009, pp. 1-5, Published in: U.S.

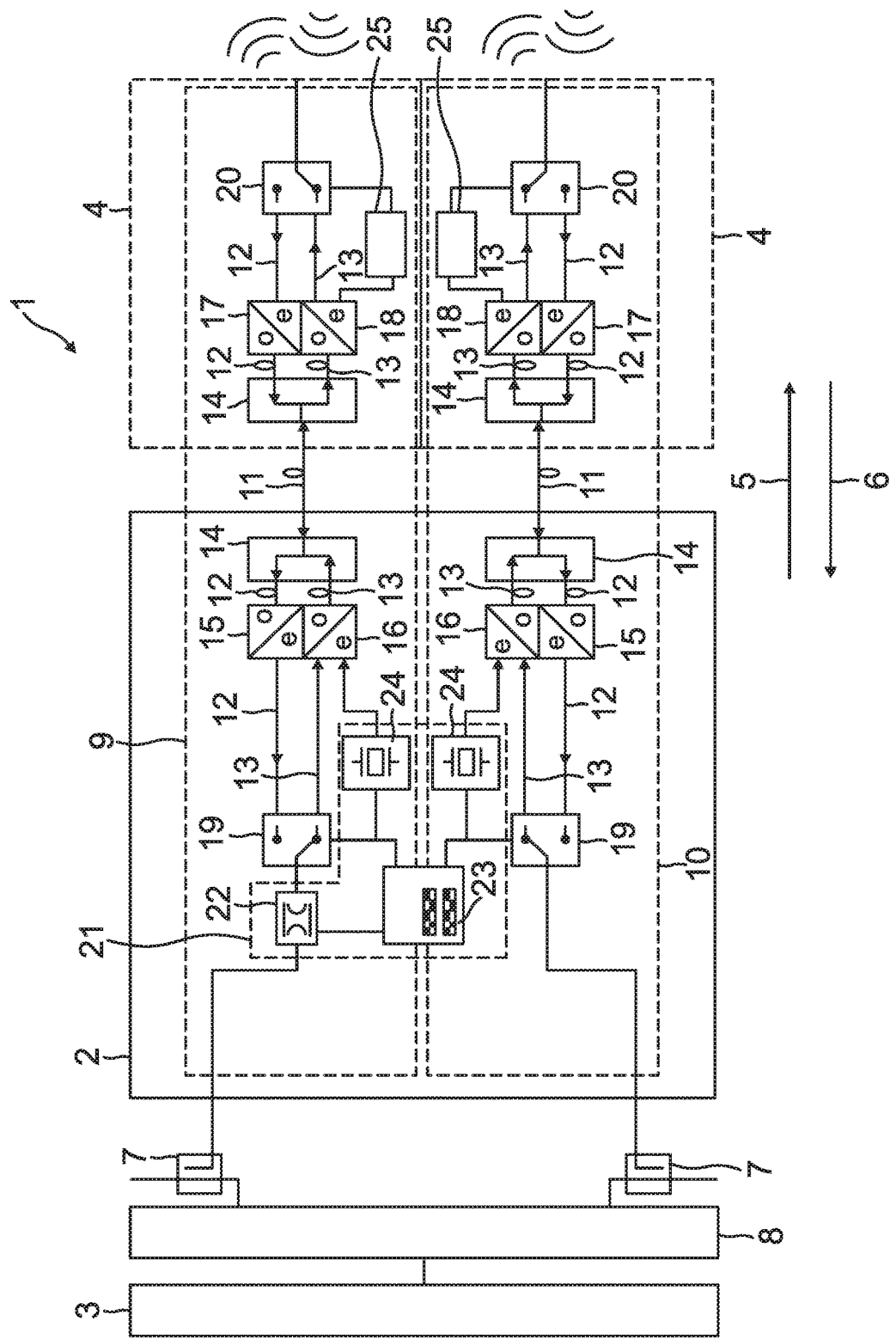

TDD REPEATER FOR A WIRELESS NETWORK AND METHOD FOR OPERATING SAID REPEATER

RELATED APPLICATIONS

This Application is a Continuation Application of U.S. application Ser. No. 14/279,100, filed May 15, 2014, now U.S. Patent Publication No. 2014/0254440, published Sep. 11, 2014, entitled "TDD REPEATER FOR A WIRELESS NETWORK AND METHOD FOR OPERATING SAID REPEATER"; which Application is a Continuation Application of U.S. application Ser. No. 12/936,760, filed Feb. 25, 2011, now issued U.S. Pat. No. 8,730,848, issued May 20, 2014, entitled "TDD REPEATER FOR A WIRELESS NETWORK AND METHOD FOR OPERATING SAID REPEATER"; which Application is a National filing of and claims priority to International Application No. PCT/EP2009/001655, filed Mar. 7, 2009, now International Publication Number WO2009/124624, published Oct. 15, 2009, entitled "TDD REPEATER FOR A WIRELESS NETWORK AND METHOD FOR OPERATING SAID REPEATER", which Application claims priority to German Application Serial No. DE 200810017881, filed Apr. 9, 2008, entitled "TDD REPEATER FOR A WIRELESS NETWORK AND METHOD FOR OPERATING SAID REPEATER", which Application, Patent, and Publications are each incorporated herein by reference in their entireties.

FIELD OF THE INVENTION

The invention relates to a repeater for transmitting communication signals in a wireless network—for example a mobil radio network or a so-called "Wireless Local Area Network" (WLAN)—according to the so-called time-division duplex (TDD) method. The invention also relates to a method for operating such a repeater.

BACKGROUND OF THE INVENTION

Within a wireless network, communication is usually effected between so-called base stations and data receivers and transmitters, hereinafter referred to as network terminals. In the case of a mobile radio network, these network terminals are mobile communication terminals ("cellular telephones"), in the case of a WLAN, they are typically mobile computers ("laptops") with corresponding network interface cards. During data exchange between the base station and a network terminal, radio signals are transmitted, on the one hand, in a so-called "downlink direction" from the base station to the network terminal and, on the other hand, in a so-called "uplink direction", from the network terminal to the base station. To separate the signal communications in uplink direction and downlink direction from each other, the so-called time-division duplex (TDD) method is used, among others. In the TDD method, the same transmission frequency is used both in uplink and in downlink direction. For an undisturbed signal transmission, a defined time window is allocated to each signal direction, so that transmission is effected alternately in uplink and in downlink direction with a specific clock pulsing. The clock pulsing is usually preset by the base station.

To enable signal transmission even in an area shadowed for radio waves, such as, for example, in a tunnel or inside a building, so-called repeaters are used, which from the point of view of transmission engineering are inserted between the base station and the network terminals. A repeater working according to the TDD method is known, for example, from US 2007/0015462 A1.

In one design, also called distribution system, such a repeater comprises a master unit, communicating in particular with the base station of the radio network, as well as at least one so-called "remote unit", which—arranged, for example, inside the building—established the contact with the network terminal. The signal transmission between the master unit and the remote unit is often effected in the form of an optical communication signal through an optical waveguide, for example a fiber optic cable.

The master unit forwards the signal received from the base station in the downlink direction to the remote unit. Vice versa, the remote unit forwards a signal arriving from the mobile-communication terminal in the uplink direction to the master unit. Often, the signals in uplink and in downlink direction are transmitted through a common waveguide.

To use such a repeater within the framework of a TDD signal transmission, the signal transmission through the waveguide must be adapted to the preset clock pulsing of the surrounding radio-signal transmission. In particular, the master unit and the remote unit have to be synchronized with each other in conformity with the clock pulsing.

SUMMARY OF THE INVENTION

The invention is based on the task to provide a repeater which is particularly suitable for a time-division duplex transmission of communication signals. In this connection, one understands by communication signals—contrary to repeater-internal signals—those signals which are transmitted beyond the repeater between the base station and the network terminals. The invention is, furthermore, based on the task to provide a method particularly suitable for operating such a repeater.

BRIEF DESCRIPTION OF THE DRAWING

The accompanying drawing, which is incorporated in and constitutes a part of this Specification, illustrates embodiments of the invention and, together with a general description of the invention given below, serves to explain the principles of the invention. Parts and variables corresponding to each other are in all figures always identified by the same reference numbers.

FIG. 1 is a circuit block diagram of one embodiment of the invention.

DETAILED DESCRIPTION OF EMBODIMENT OF THE INVENTION

Regarding the repeater, this task is solved according to an embodiment of the invention, according to which the repeater comprises a master unit for communicating with a base station of a wireless network, at least one remote unit for communicating with a network terminal, and a waveguide connecting the remote unit with the master unit for transmitting the communication signals in an uplink direction from the remote unit to the master unit and in a downlink direction from the master unit to the remote unit. Both the master unit and the remote unit comprise a switch—hereinafter referred to as (time) duplexer—for changing over between the signal transmission in uplink direction and the signal transmission in downlink direction. Both duplexers are selected by a synchronizing unit arranged in the master unit, said synchronizing unit being designed for determining a clock pulsing from the communication signal fed to the master unit—in particular from the base station—and for supplying a control signal corresponding to this clock pulsing to the duplexers.

With the proposed repeater, it is possible to adapt the transmission or transmission direction of the communication signals to a clock pulsing preset by the base station in a simple and efficient manner. It is particularly advantageous in this connection that in the proposed repeater, the duplexer of the remote unit, too, is synchronized by the synchronizing unit arranged in the master unit, so that the repeater can be designed in a particularly efficient way.

The repeater is preferably designed for optical signal transmission between the master unit and the remote unit. In this case, the waveguide is an optical waveguide, in particular a fiber optic cable. Alternatively, however, an electrical signal transmission between the master unit and the remote unit can also be provided. In this case, the waveguide is designed in particular as a coaxial cable or as a hollow conductor.

In a particularly efficient embodiment of the invention, the repeater is adapted for transmitting the control signal for selecting the duplexer of the remote unit to the remote unit in the form of an (optical or electrical) signal via the waveguide provided anyhow for the exchange of the communication signals. A simple separation of the control signal from the communication signal—transmitted via the same waveguide—is possible in particular through the fact that the synchronizing unit provides the control signal with a modulation frequency different from that of the communication signal.

To acquire the clock pulsing, the synchronizing unit expediently comprises a coupler, with which it picks off the communication signal. The synchronizing unit determines a clock signal overlaying the communication signal, said clock signal being formed, for example, by a so-called "pilot tone" or a synchronization sequence in a preamble of a transmission frame of the communication signal. In particular, the synchronizing unit comprises, for extracting the clock signal from the communication signal, a circuit, in particular a circuit designed as a microcontroller, to which the decoupled signal is fed.

Preferably, the control signal is generated first of all in the form of an electrical radio-frequency (RF) signal. For this purpose, the synchronizing unit comprises a frequency generator. For transmission to the remote unit, this RF control signal is preferably converted into an optical control signal and transmitted through the waveguide to the remote unit. For this purpose, the master unit expediently comprises an optical transmitter. In the remote unit, the control signal is in this case converted back, by means of an optical receiver arranged in the remote unit, into an electrical control signal and used for selecting the duplexer arranged in the remote unit.

In a further embodiment of the invention, the repeater comprises at least two remote units, each of them connected by a separate waveguide with the master unit. Each of these remote units comprises a duplexer. Additionally, one duplexer for each remote unit is provided in the master unit. Efficiently, all duplexers are selected by a common synchronizing unit—also arranged in the master unit.

Additionally or alternatively, the repeater comprises at least two remote units connected by a common waveguide with the master unit. In this case, the repeater is designed for modulating the signals associated to each remote unit into different transmission wave lengths, so that these signals can be separated by means of their specific transmission wave lengths.

In a preferred embodiment of the repeater, several remote units are in particular connected to the master unit in a so-called m×n MIMO (Multiple Input Multiple Output; m,n=2, 3, . . . ) configuration. In this case, the master unit contains several separate transmission links, each of them corresponding with a remote unit. The master unit, on the other hand, is provided with two antenna connection points for signal transmission with the base station.

Concerning the method, the task is solved according to the invention, using the above-described repeater, by the features of claim 8, which provides the generation of a control signal through the synchronizing unit, by means of a preset clock signal—preset in particular by the base station—and the selection, with this control signal, of both the duplexer of the master unit and the duplexer of the remote unit in such a way that the change-over of the signal transmission between uplink and downlink direction is effected synchronously—i.e. approximately simultaneously—with the preset clock pulsing.

The synchronous selection of the duplexers, however, preferably takes into account the propagation time of the communication signals between the master unit and the remote unit. The duplexers arranged in the master unit and the duplexer arranged in the remote unit are not switched exactly simultaneously, but with a slight time staggering corresponding approximately to the signal propagation time.

In the following, an exemplary embodiment of the invention is explained in detail by means of a drawing, in which the only FIGURE is a schematic representation of a repeater 1 of a wireless network for the so-called "time-division duplex" signal transmission in an area shadowed for radio waves, such as, for example, a building.

The repeater 1 comprises a master unit 2 which communicates—in this case in a wire-bound manner—with a base station 3 (represented on the left side of the FIGURE) of the wireless network. In addition, the repeater 1 comprises two remote units 4 (represented on the right side of the FIGURE), which—arranged, for example in the building—communicate with a mobile network terminal (e.g. a laptop or a cellular telephone) via schematically indicated radio waves. A radio frequency (RF) communication signal arriving from the base station 3 is forwarded in a so-called downlink direction 5 (indicated by an arrow) in the form of an optical communication signal to the remote units 4, converted back there into a radio signal and transmitted to the network terminal. Vice versa, a communication signal sent by the network terminal is forwarded in a so-called uplink direction 6 (also indicated by an arrow) in the form of an optical communication signal to the master unit 2 and transmitted from there to the base station 3.

The repeater 1 is in this case designed in a so-called "2×2 Multiple Input Multiple Output" (MIMO) configuration. Accordingly, the base station 3 possesses two antenna connection points 7 connected through an antenna or distributing bus bar 8 with the base station 3. On the other hand, signal transmission to the two remote units 4 is effected through two separate channels, namely a first transmission link 9 (indicated schematically) and a second transmission link 10 (also indicated schematically). Each transmission link 9,10 comprises for optical signal transmission a separate optical waveguide, which in the present case is designed as a fiber optic cable 11 and through which each remote unit 4 is connected with the master unit 2. Alternatively, a separate signal transmission, from the point of view of signalling technology, due to a frequency transformation, by means of a common waveguide (frequency duplex), is also possible.

The repeater 1 is designed for signal transmission according to the so-called time-division duplex method, by which the (optical) communication signals are transmitted alternately in time in downlink direction 5 or uplink direction 6, respectively, according to a clock pulsing preset by the base station 3. For this purpose, each transmission link 9, 10 is split both inside the master unit 2 and inside the remote unit 4 into a—partly optical, partly electrical—uplink 12 and a downlink 13, the optical part of the link being coupled in each case via a Y-connection 14 with the fiber optic cable 11. The electrical part is connected at least indirectly with the base station 3 or with the mobile data receiver/transmitter. Within each link, the communication signal is converted from an optical signal into an electrical signal or vice versa. For this purpose, the master unit 2 comprises within each uplink 12 an optical receiver 15 and within each downlink 13 an optical transmitter 16, whereas each remote unit 4 comprises within the uplink 12 an optical transmitter 17 and within the downlink 13 an optical receiver 18.

For changing over the transmission direction, the master unit 2 comprises for each transmission link 9, 10 a (time) duplexer 19, with which the change-over in the electrical part between the uplink 12 and the downlink 13 is effected. Thus, depending on the position of the duplexer 19, either the uplink 12 or the downlink 13 is connected with the base station 3. On the other hand, each remote unit 4 also comprises within the electrical part of the transmission link 9, 10 a (time) duplexer 20, with which either the uplink 12 or the downlink 13, depending on the switch position, is connected with the mobile data receiver/transmitter for communication. The switch position shown here corresponds, for example, to a transmission in downlink direction 6.

To synchronize the clock pulsing of the optical transmission with the clock pulsing of the base station 3, the master unit 2 comprises a synchronizing unit 21 which picks off a clock signal sent by the base station 3 and selects the duplexer 19, on the one hand, and each duplexer 20, on the other hand, accordingly.

For this purpose, the synchronizing unit 21 possesses a coupler 22, with which the communication signal fed from the base station 3 to the master unit 2 is decoupled. In the shown embodiment of the invention, the coupler 22 accesses the first transmission link 9.

A clock signal, for example in the form of a so-called pilot tone, overlays this communication signal. Alternatively, the clock signal is connected ahead in the form of a so-called preamble of a signal transmission frame. This clock signal is identified by the synchronizing unit 21.

For this purpose, the synchronizing unit 21 comprises an integrated circuit, in particular a microcontroller, here referred to as "switching-point detector" 23, connected, from the point of view of signal technology, with the coupler 22. By means of the decoupled signal, the switching-point detector 23 decides whether the base station 3 is transmitting (transmission in downlink direction 5) or receiving (transmission in uplink direction 6). Accordingly, the switching-point detector 23 directly selects both duplexers 19 of the master unit 2.

In order to synchronize, in addition, the duplexers 20 of the remote units 4, an optical control signal is transmitted to them, by means of the decoupled clock signal, via each fiber optic cable 11. For this purpose, the synchronizing unit 21 possesses for each transmission link 9, 10 one frequency generator 24. Each frequency generator 24 is also coupled with the switching-point detector 23, from the point of view of signalling technology, and generates, due to the latter's information, an RF control signal for selecting the corresponding duplexer 20. The RF control signal is in each case converted by the optical transmitter 16 of the master unit 2 into an optical control signal and transmitted, together with the optical communication signal, via the fiber optic cable 11 to the remote unit 4, the control signal and the communication signal being sent with different modulation frequencies in order to separate them. Inside the remote unit 4, the optical receiver 18 converts the optical control signal back into an electrical control signal. This control signal, in turn, serves as a signal generator for a control unit 25, which finally supplies the duplexer 20 with clock pulses.

Therefore, both duplexers 19, 20 of each transmission link 9, 10 are synchronously supplied with clock pulses, whereby the transmission direction of the communication signals on the optical transmission section is adapted to the transmission direction of the surrounding radio transmission. Thus, in send mode of the base station 3, both duplexers 19, 20 are switched for a transmission in downlink direction 5, whereas in receive mode of the base station 3, the duplexers 19, 20 are switched for a transmission in uplink direction 6.

LIST OF REFERENCE NUMBERS

1 Repeater
2 Master unit
3 Base station
4 Remote unit
5 Downlink direction
6 Uplink direction
7 Antenna connection point
8 Distributing bus bar
9 Transmission link
10 Transmission link
11 Fiber optic cable
12 Uplink
13 Downlink
14 Y-connection
15 Receiver
16 Transmitter
17 Transmitter
18 Receiver
19 (Time) duplexer
20 (Time) duplexer
21 Synchronizing unit
22 Coupler
23 Switching-point detector
24 Frequency generator
25 Control unit

What is claimed is:

1. A time-division duplex (TDD) repeater system comprising:
   a master unit configured for communicating with a base station of a wireless network;
   at least one remote unit configured for communicating with a terminal device and located away from the master unit;
   a waveguide connecting the remote unit with the master unit for transmitting communication signals in an uplink direction and in a downlink direction;
   the master unit configured for exchanging uplink and downlink communication signals with the at least one remote unit;

the at least one remote unit having a defined uplink path and a separate defined downlink path therein and including a switch coupled with each of the defined paths for changing direction of the signal transmission in the at least one remote unit between transmission in the uplink direction and transmission in the downlink direction;

a control unit located in the at least one remote unit and configured for processing a signal portion of the signals in at least one of the uplink direction and the downlink direction, the control unit using the processed signal portion for determining the direction of the repeater system signal transmission and for controlling the remote unit switch and the signal transmission direction;

wherein the signal portion is derived from a radio-frequency (RF) control signal generated by the TDD repeater system and wherein the control unit drives the remote unit switch at a frequency determined from the processed signal portion.

2. The TDD repeater system of claim 1, wherein the control unit is further configured for generating clock pulses to control the remote unit switch.

3. The TDD repeater system of claim 1, wherein the control unit is configured for processing a signal portion of the signals in the downlink direction and using the processed downlink signal portion for determining the direction of the repeater system signal transmission.

4. The TDD repeater system of claim 3, wherein the control unit is configured for processing a signal portion of the signals from the master unit in the downlink direction and using the processed master unit signal portion for determining the direction of the repeater system signal transmission.

5. The TDD repeater system of claim 1, further comprising multiple remote units, each remote unit connected with the master unit by a separate waveguide, each remote unit including a control unit configured for processing the signal portion to determine the direction of the repeater system signal transmission.

6. The TDD repeater system of claim 1, further comprising multiple remote units, connected with the master unit by a common waveguide.

7. The TDD repeater system of claim 1 further comprising at least one optical transmitter in the master unit for converting the downlink signals to optical signals for being transmitted to the at least one remote unit.

8. The TDD repeater system of claim 7 further comprising at least one optical receiver in the at least one remote unit for receiving the downlink signals and converting them to electrical signals.

9. The TDD repeater system of claim 1 wherein the master unit and at least one remote unit are configured in a multiple input multiple output (MIMO) configuration.

10. The TDD repeater system of claim 1 wherein the master unit further has a defined uplink path and a separate defined downlink path therein and including a switch coupled with each of the defined paths for changing direction of the signal transmission in the master unit.

11. A method for time-division duplex (TDD) signal repeating comprising:

communicating communication signals with a master unit from a base station of a wireless network;

transmitting the communication signals with a waveguide between the master unit and at least one remote unit including selectively transmitting the communication signals in an uplink direction and in a downlink direction;

in the at least one remote unit, having a defined uplink path and a separate defined downlink path, using a switch coupled with each of the defined paths for changing direction of the signal transmission between transmission in the uplink direction and transmission in the downlink direction;

in the at least one remote unit, processing a signal portion of the signals in at least one of the uplink direction and the downlink direction and using the processed signal portion for determining the direction of the repeater system signal transmission and for controlling the remote unit switch and the signal transmission direction;

wherein the signal portion is derived from a radio-frequency (RF) control signal generated by the TDD repeater system and wherein the control unit drives the remote unit switch at a frequency determined from the processed signal portion.

12. The method of claim 11 further comprising generating clock pulses to control the remote unit switch.

13. The method of claim 11, further comprising processing a signal portion of the signals in the downlink direction and using the processed uplink signal portion for determining the direction of the repeater system signal transmission.

14. The method of claim 13, further comprising processing a signal portion of the signals from the master unit in the downlink direction and using the processed master unit signal portion for determining the direction of the repeater system signal transmission.

15. The method of claim 11 further comprising transmitting the communication signals with the waveguide between the master unit and multiple remote units with each remote unit connected with the master unit by a separate waveguide, and processing the signal portion to determine the direction of the repeater system signal transmission.

16. The method of claim 11 further comprising transmitting the communication signals with the waveguide between the master unit and multiple remote units and connecting the multiple remote units to the master unit by a common waveguide.

17. The method of claim 11 further comprising converting the downlink signals at the master unit to optical signals for being transmitted to the at least one remote unit.

18. The method of claim 17 further converting the downlink signals at the at least one remote unit to electrical signals.

19. The method of claim 11 wherein the master unit and at least one remote unit are configured in a multiple input multiple output (MIMO) configuration.

* * * * *